United States Patent
Korman et al.

(10) Patent No.: US 10,045,022 B2
(45) Date of Patent: Aug. 7, 2018

(54) ADAPTIVE CONTENT DEPENDENT INTRA PREDICTION MODE CODING

(71) Applicant: Synopsys, Inc., Mountain View, CA (US)

(72) Inventors: Mikhail Korman, Saint Petersburg (RU); Oleg V. Prosekov, Saint Petersburg (RU)

(73) Assignee: Synopsys, Inc., Mountain View, CA (US)

( * ) Notice: Subject to any disclaimer, the term of this patent is extended or adjusted under 35 U.S.C. 154(b) by 113 days.

(21) Appl. No.: 15/214,732

(22) Filed: Jul. 20, 2016

(65) Prior Publication Data

US 2017/0064331 A1 Mar. 2, 2017

(30) Foreign Application Priority Data

Aug. 25, 2015 (RU) .............................. 2015136079

(51) Int. Cl.
*H04N 19/11* (2014.01)
*H04N 19/176* (2014.01)
*H04N 19/159* (2014.01)
*H04N 19/593* (2014.01)
*H04N 19/147* (2014.01)

(52) U.S. Cl.
CPC .......... *H04N 19/11* (2014.11); *H04N 19/147* (2014.11); *H04N 19/159* (2014.11); *H04N 19/176* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 2013/0089137 A1 | 4/2013 | Korman et al. | |
| 2013/0101029 A1* | 4/2013 | Srinivasan | H04N 19/11 375/240.12 |
| 2013/0163671 A1 | 6/2013 | Korman et al. | |
| 2013/0243087 A1* | 9/2013 | Lee | H04N 19/593 375/240.12 |
| 2015/0195519 A1* | 7/2015 | Li | H04N 19/119 375/240.03 |

(Continued)

OTHER PUBLICATIONS

S. Yan, L. Hong, W. He & Q. Wang, "Group-Based Fast Mode Decision Algorithm for Intra Prediction in HEVC", 8 Int'l Conf. on Signal Image Tech. & Internet Based Sys. 225-229 (Nov. 2012) (Year: 2012).*

(Continued)

*Primary Examiner* — David N Werner
(74) *Attorney, Agent, or Firm* — Fenwick & West LLP

(57) ABSTRACT

A system and a method are disclosed for encoding and decoding a video frame using spatial prediction. The video frame is separated into a plurality of image blocks, and a plurality of spatial predictors is created for an image block using methods well-known in the art. The set of predictors is reduced to a set containing fewer spatial predictors before continuing the coding process for the block. The reduction of spatial predictors involves comparing a plurality of spatial predictors in a predetermined sequence and grouping or processing a subset of the spatial predictors to a set of representative spatial predictors.

18 Claims, 11 Drawing Sheets

(56) References Cited

U.S. PATENT DOCUMENTS

2015/0195520 A1* 7/2015 Li .................. H04N 19/119
375/240.02
2016/0330454 A1* 11/2016 Lim .................. H04N 19/182

OTHER PUBLICATIONS

ITU-T Recommendation H.265 (Apr. 2013) (Year: 2013).*
P.K. Ranjan, D. Pacharla, B. Ravindran, & D. Mani, "Quality Evaluation of HEVC Main Still Picture with Limited Coding Tree Depth and Intra Modes", Proc. of the 2014 Int'l Conf. on Advances in Computing, Communications, & Informatics (ICACCI) 338-343 (Sep. 2014) (Year: 2014).*
Y. Liu, X. Liu, & B. Shao, "Fast Intra Mode Decision Algorithm for HEVC Based on Texture Detection", 17 IEEE Int'l Conf. on Computational Sci. & Engineering (CSE 2014) 1047-1050 (Dec. 2014) (Year: 2014).*
X. Xu, R. Cohen, A. Vetro, & H. Sun, "Predictive Coding of Intra Prediction Modes for High Efficiency Video Coding", Proc. of the 2012 Picture Coding Symposium (PCS 2012) 457-460 (May 2012) (Year: 2012).*
A. Abramowski & G. Pastuszak, A Double-Path Intra Prediction Architecture for the Hardware H.265/HEVC Encoder, 17 Int'l Symposium on Design & Diagnostics of Electronic Cir. & Sys. 27-32 (Apr. 2014) (Year: 2014).*
T.L. Da Silva, L.V. Agostini, & L.A. da Silva Cruz, "Fast HEVC Intra Prediction Mode Decision Based on Edge Direction Information" , 20 Eur. Signal Processing Conf. 1214-1218 (Aug. 2012) (Year: 2012).*
W. Jiang, H. Ma, & Y. Chen, "Gradient Based Fast Mode Decision Algorithm for Intra Prediction in HEVC", 2 Int'l Conf. on Consumer Electronics, Comms. & Networks 1836-1840 (May 2012) (Year: 2012).*

* cited by examiner

ADAPTIVE CONTENT DEPENDENT INTRA PREDICTION MODE CODING

REFERENCE TO RELATED APPLICATION

This application claims priority under 35 U.S.C. § 119(a) to Russian Patent Application No. 2015136079 filed on filed on Aug. 25, 2015, which is incorporated by reference herein in its entirety.

BACKGROUND

1. Field of Art

The disclosure generally relates to the field of video compression, and more specifically to the selection and coding of spatial prediction mode information for the compression of video files.

2. Description of the Related Art

The popularity of high-resolution displays, faster computing equipment, and high-speed internet connections has given many people the capability to download, store, and view videos on their computing devices. Since video files are typically larger than most other forms of digital multimedia, techniques to reduce the file size of videos are of especially high interest to many entities, such as online content providers and internet service providers who wish to reduce their operating costs. Several techniques exist to compress video files so they can be transferred and stored more efficiently. Many compression methods take advantage of the fact that video files typically contain large amounts of repeated information. For example, a sequence of consecutive frames typically contains similar images, and individual frames may contain large areas of similar image information, such as shadows or blue skies.

Many modern video codecs operate by dividing a video frame into a series of small blocks and using several different techniques (called prediction modes) to predict the content of the block. Each prediction mode generates a predictor, which is a two-dimensional block of data that contains an estimate of the contents of the block. There are two broad categories of prediction modes. Temporal modes (inter prediction modes) use data from blocks in previously decoded frames to predict the contents of a block, while spatial modes (intra prediction modes) use information from blocks in the same frame. Once all predictors have been calculated, the predictor that yields the best Rate-Distortion function value to the raw data in the block is chosen, and an identifier for the predictor is stored in the bit stream along with a residual that represents the difference between the predictor and the raw data in the block.

Nowadays intra prediction mode (identifier) coding is enhanced with use of most probable mode technique: codec considers a few most probable modes (MPMs) selected based on information from previously coded blocks. If the optimum for Rate-Distortion function value is achieved on a predictor from MPMs set, the representation of the corresponding identifier in the bitstream is shortened compared to other potential modes.

As the number of predictors increases, the number of bits needed to identify the prediction mode used for each block also increases. When more bits are needed to identify each prediction mode, the size of the compressed video file might increase, thus reducing the effectiveness of the codec. MPM technique allows reducing the average length of prediction mode data representation in the bitstream. Modern MPMs use information on prediction direction from previously coded blocks into account assuming neighboring blocks having homogeneous texture.

SUMMARY

Embodiments relate to a method for encoding an image frame where a set of predictors are generated by using predictor modes. The set of predictors for an image block of an image frame includes a plurality of image blocks. Each of the set of predictors is generated with a different prediction mode. The prediction modes include angular prediction modes and non-angular prediction modes. One or more groups of predictors are generated by comparing the set of predictors by making comparison of the set of predictors in a predetermined sequence based on a difference metric. Similar predictors are assigned to a same group of predictors. For each of the one or more groups of predictors, a representative predictor in the group of predictors is generated. One predictor of one or more representative predictors with a lowest difference in content relative to the image block is selected. The image block is encoded based on the selected predictor.

In one embodiment, the representative predictor is generated by averaging the group of predictors.

In one embodiment, the coding scheme is High Efficiency Video Coding (HEVC) specification.

In one embodiment, the representative predictor is generated by a mode that is defined in a coding specification as being a preferred mode.

In one embodiment, bitstream including the image block encoded using the selected predictor is generated. The bitstream comprises prediction mode information and Luma residual blocks generated using a predictor mode indicated in the prediction mode information.

In one embodiment, the prediction mode information precedes a corresponding Luma residual block.

In one embodiment, a bit in the prediction mode information is omitted when one group of predictors is generated.

In one embodiment, the predictor mode information includes at most two bits when three groups of predictors are generated.

In one embodiment, the difference metric is the Sum of Absolute Differences metric.

In one embodiment, a most probable modes (MPM) selection or non-MPM selection is performed when more than three groups of predictors are generated.

In one embodiment, Shannon-Fano entropy coding is used to select when the non-MPM selection is performed.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
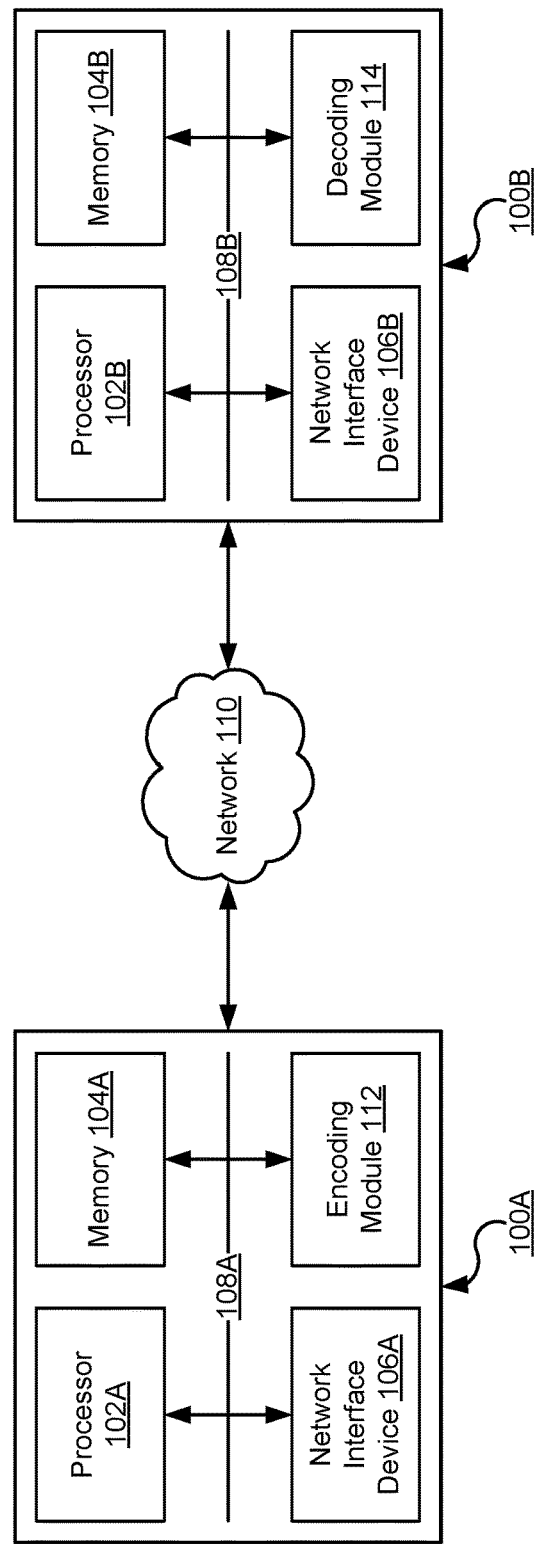
FIG. 1 is a block diagram illustrating a typical computing environment for video encoding and decoding processes.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. The following description that alternative embodiments of the structures and methods illustrated herein may be employed without departing from the principles described herein.

Embodiments relate to spatial prediction for encoding or decoding of video frames where spatial predictors of a block in a video frame are reduced to fewer representative spatial predictors before continuing the encoding process. The reduction of the spatial predictors involves comparing a plurality of spatial predictors and grouping or processing a subset of the spatial predictors to a set of representative spatial predictors. Because the number of spatial predictors is reduced, fewer bits may be used in a bit stream to identify a chosen spatial predictor.

For coding specifications involving most probable modes (MPM) techniques the effect caused by reduced modes set may not be enough for achieving rate-distortion performance improvement. Thus, embodiments relate to efficient combination of MPM approach with modes set reduction technique. Direction information of predictors is very important for MPM efficiency. Thus, embodiments distinguish between angular and non-angular predictors. Representative spatial predictors are constructed such that prediction modes represented by them ordered in clockwise order have no gaps. If all possible predictors are represented by one single representative mode then no bits required for mode information identification in the bit stream.

In a decoding process, the same process of reducing the spatial predictors is preformed to identify the chosen spatial predictor and reconstruct the block.

A predictor, as used herein, refers to a prediction of the contents of both luminance and chrominance block in a video frame. During an encoding or decoding process, a video compression scheme may generate a plurality of predictors using a plurality of different prediction methods and use a variety of methods to select one of the predictors to use for encoding or decoding the block. Specifically, a spatial predictor is a prediction that is generated using content from the same video frame. For example, a spatial predictor may be a prediction of a block that is generated based on the pixels adjacent to the block.

Example Architecture for Encoding or Decoding of Video

FIG. (FIG. 1 is a block diagram illustrating a typical environment for video encoding and decoding processes. The environment includes two computing devices 100A, 100B connected over a network 110 (e.g., the Internet). Each of the computing devices 100A, 100B contains, among other components, a processor 102A or 102B, memory 104A or 104B, and a network interface device 106A or 106B. Additionally, the computing device 100A contains an encoding module 112, and the computing device 100B contains a decoding module 114. The components in the two computing devices 100A, 100B are communicatively coupled through a bus 108A or 108B.

The processor 102A or 102B in each computing device 100A, 100B executes computer-readable instructions. To execute instructions, the processor 102A or 102B may access the memory 104A or 104B. Although only one processor 102A, 102B is illustrated in each computing device 100A or 100B, each computing device 100A or 100B may contain multiple processors or processor cores that operate in parallel or perform some dedicated functions. The memory 104 is any non-transitory computer-readable storage medium capable of storing both data and computer-readable instructions accessed by the processor 102. The memory 104 may include any combination of volatile storage (e.g., RAM) and non-volatile storage (e.g., hard disk drive, solid state drive, compact disc). The network interface devices 106A, 106B exchange data between the computing devices 100A, 100B, and other devices that are connected over the network 110.

The encoding module 112 is hardware, software, firmware or a combination thereof for receiving an unencoded raw video, either from the memory 104A or from another source (e.g., a video camera or the output of a video decoder), and for converting the raw video into an encoded format. The video in its encoded format typically has a smaller file size than the unencoded video, thus making it easier to store the encoded video in the memory 104A or transmit the encoded video over the network 110 to another computing device.

The decoding module 114 is hardware, software, firmware or a combination thereof for receiving an encoded video, either from the memory 104B or from an external source (e.g., the computing device 100A), and for converting the encoded video into a reconstructed format that can be reproduced on a display device.

Although pictured as separate entities, the encoding module 112 or the decoding module 114 may reside in whole or in part on the processor 102 or the memory 104. For example, the Intel Core i series of processors contain a hardware H.264 encoder, which is one possible implementation of the encoding module 112. The encoding module 112 or decoding module 114 may also reside on a separate hardware device, such as an application-specific integrated circuit (ASIC) or field-programmable gate array (FPGA), and the two modules 112, 114 may also be embodied as computer-readable machine code stored in the memory 104, either as a separate software package or as a component of a larger video processing application.

Embodiments as illustrated in FIG. 1 are merely illustrative. The encoding module 112 and the decoding module 114 may be embodied on stand-alone devices that do not communicate over any network. For example, the encoding module 112 and the decoding module may be embodied on a camera or a digital video recorder. Moreover, the components of the computing device 100A, 100B may be embodied in a single integrated circuit (IC) that may operate in conjunction with other electronic components.

Encoder Architecture Overview

Figure 2:
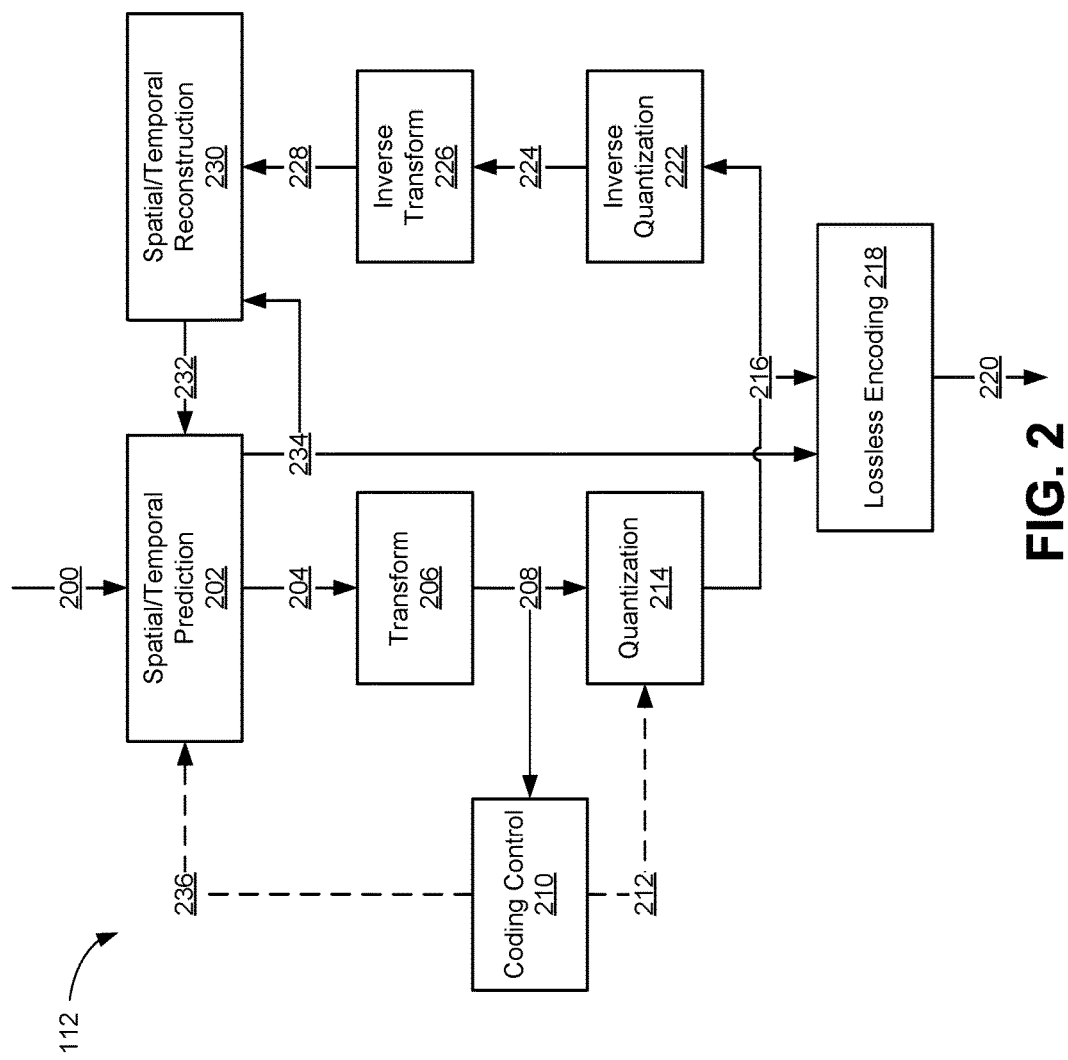
FIG. 2 is a block diagram illustrating an encoding module, according to one embodiment.

FIG. 2 is a block diagram illustrating the encoding module 112 in detail, according to one embodiment. The encoding module 112 may include, among other components, modules to perform spatial/temporal prediction 202, residual transformation 206, coding control 210, quantization 214, lossless encoding 218, inverse quantization 222, inverse transformation 226, and spatial/temporal reconstruction 230. One or more of these components may be embodied in hardware, software, firmware or a combination thereof. The modules in the encoding module 112 work in combination to convert a stream of raw video frames 200 into an encoded and compressed bit stream 220.

The spatial/temporal prediction module 202 receives a raw frame 200, separates the raw frame into a series of macro-blocks (e.g., a predetermined number of adjacent blocks, such as a 4×4 grid of blocks), separates the macro-blocks into blocks, and makes predictions on blocks to be encoded. The prediction may be either spatial or temporal prediction. In temporal prediction, the spatial/temporal prediction module 202 uses previously decoded frames to make a prediction for the current frame. In spatial prediction, the spatial/temporal prediction module 202 uses information from the same frame to make predictions on blocks included in the same frame. Depending on the type of macroblock, the spatial/temporal prediction module 202 may use either spatial prediction or temporal prediction. Embodiments described herein relate primarily to performing spatial predictions on blocks in the same frame. As a result of spatial prediction, the module 202 generates a plurality of spatial predictors.

In spatial prediction, the spatial/temporal prediction module 202 uses a plurality of prediction methods to calculate a plurality of different predictors. In one embodiment, the spatial/temporal prediction module 202 divides the frame into 4×4 blocks and uses pixels adjacent to the top and left edges of the current block to calculate nine spatial prediction modes for the current block. Each prediction mode may use any combination of the adjacent edge pixels. For example, the first prediction mode may use the four pixels adjacent to the top edge of the current block to extrapolate the pixel values of each column, whereas the second prediction mode may use the four pixels adjacent to the left edge of the current block to extrapolate the pixel values of each row. The other prediction modes may perform diagonal extrapolation, use the mean of one or more adjacent edge pixels, or use some other method to predict the contents of the block.

After the plurality of predictors has been generated, the spatial/temporal prediction module 202 compares each predictor to the original block and chooses the most accurate prediction mode. The module 202 subtracts the chosen predictor from the original block to calculate a residual, which represents the difference between the chosen predictor and the original block. In one embodiment, the residual is a rectangular array wherein each element represents the residual for an individual pixel in the block. The spatial/temporal prediction module 202 sends the residual 204 to the transform module 206 and sends the chosen prediction mode 234 directly to the lossless encoding module 218 and the spatial/temporal reconstruction module 230.

In addition to the raw frames 200, the spatial/temporal prediction module 202 also receives reconstructed blocks from previous frames 232 from the spatial/temporal reconstruction module 230. The module 202 uses the reconstructed blocks 232 to perform temporal prediction. The spatial/temporal prediction module may also receive a similarity threshold 236 from the coding control module 210. The module 202 uses a similarity threshold in the spatial predictor reduction process to determine whether a pair of spatial predictors can be considered similar. The similarity threshold can be a predetermined constant that is saved in the spatial/temporal prediction module 202, or the threshold may be calculated in the coding control module and sent to the spatial/temporal prediction module 202.

The transform module 206 receives the residuals 204 from the spatial/temporal prediction module 202 and performs a mathematical transform on the residual 204 to decompose it into a weighted sum of components. In one embodiment, the discrete cosine transform (DCT) is used as the mathematical transform, and DCT coefficients in the form of an array (having the same dimensions as the array of residuals) are generated as a result. After the coefficients are calculated, the transform module sends the coefficients 208 to the coding control module 210 and the quantization module 214.

The coding control module 210 uses the transform coefficients 208 to calculate parameters that control the encoding process. The parameters may include, for example, a quantization coefficient 212 and a similarity threshold 236. A quantization coefficient 212 is a parameter used in lossy compression algorithms to compress a plurality of values into a single quantized value. As described above with reference to the spatial/temporal prediction module 202, the similarity threshold 236 is used in the spatial predictor reduction process to determine whether two predictors are similar. The coding control module 210 may use parameters such as the quantization coefficient 212 or a rate-distortion slope to determine the value of the similarity threshold 236. The quantization coefficient 212 is sent to the quantization module 214, and the similarity threshold 236 is sent to the spatial/temporal prediction module 202 to be used in the spatial predictor reduction process, as described below in detail with reference to FIGS. 3 and 4A. In other embodiments, the quantization coefficient 212 or the similarity threshold 236 may remain constant and are not modified by the coding control module 210.

The quantization module 214 uses a quantization coefficient 212 to quantize the transform coefficients 208, using methods well known in the art. After calculating the quantized coefficients 216, the quantization module 214 sends the quantized transform coefficients 216 to the lossless encoding module 218 and the inverse quantization module 222.

The lossless encoding module 218 receives quantized transform coefficients 216 and prediction mode information 234 and losslessly compresses both streams of data into a single bit stream 220. The single bit stream 220 for macroblocks encoded using spatial prediction may be formatted in a manner, as described below in detail with reference to FIG. 4B. In one embodiment, the lossless encoding module compresses the data 216, 234 by performing entropy encoding, although any lossless data compression scheme may be used. One of the advantages of embodiments described herein is that the size of the bit stream 220 is reduced through reduction in the number of predictors, as described below in detail with reference to FIGS. 3 and 4A.

The inverse quantization 222, inverse transform 226, and spatial/temporal reconstruction modules 230 work in combination to reconstruct blocks from previous frames 232 using the quantized transform coefficients 216 and the prediction mode information 234. Processes associated with the operation of inverse quantization 222 and inverse transform modules 226 are well known in the art, and hence, description on the operation of these modules is omitted herein for the sake of brevity. In temporal prediction, the spatial/temporal reconstruction module 230 also performs operations that are well-known in the art. However, the component of the spatial/temporal reconstruction module 230 that performs spatial reconstruction is modified to use the same spatial predictor reduction process that was used to perform the spatial prediction in the spatial/temporal prediction module 202. This component and an overall process for decoding a macro-block that has been encoded with the spatial predictor reduction process are described with reference to FIGS. 6 and 8, respectively.

Figure 3A:
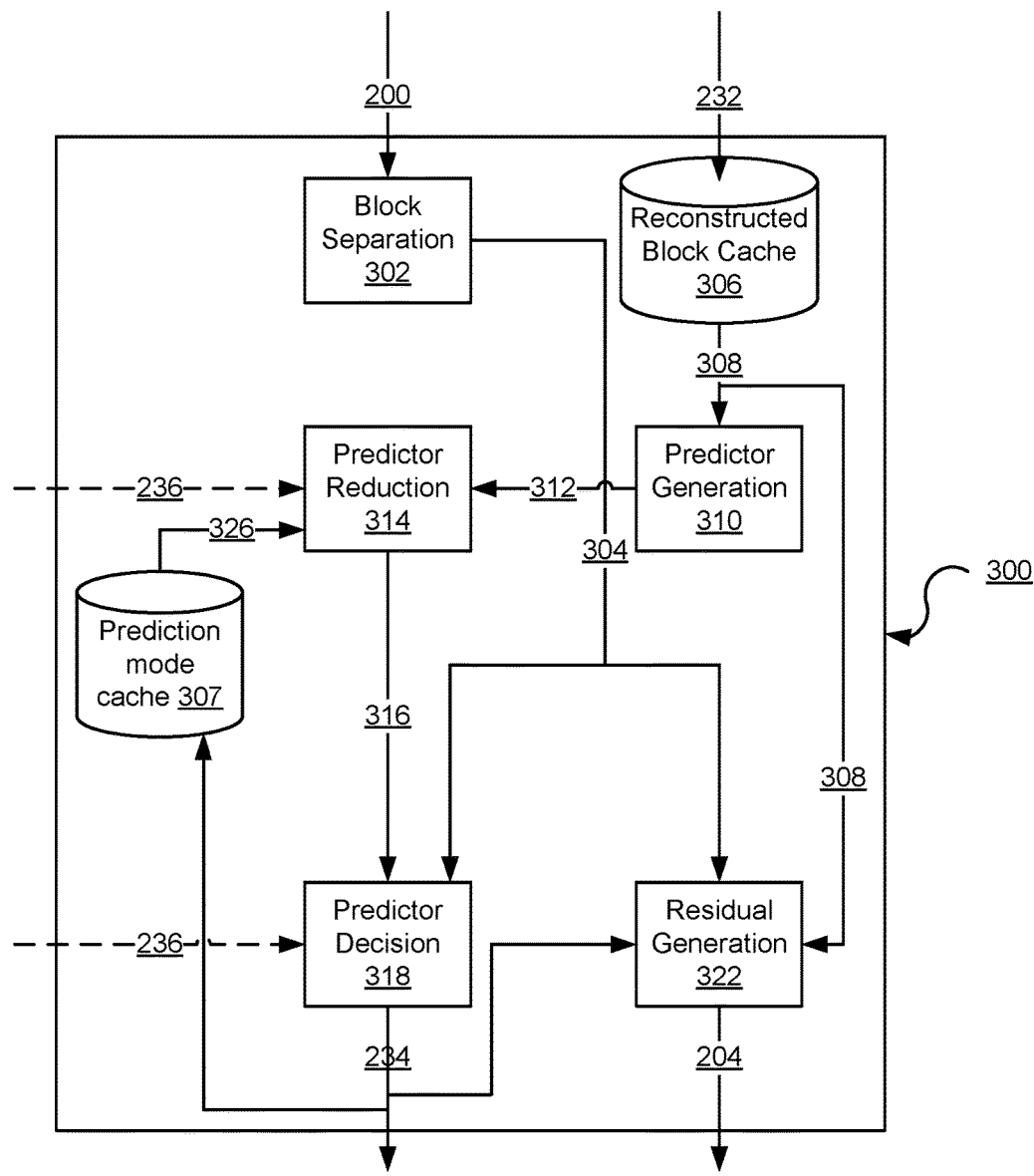
FIG. 3A is a block diagram illustrating a system for performing spatial prediction of blocks in a video frame, according to one embodiment.

FIG. 3A is a block diagram illustrating a module 300 within the spatial/temporal prediction module 202 for performing spatial prediction, according to one embodiment. The spatial prediction module 300 may contain, among other components, a block separation module 302, a reconstructed block cache 306, a prediction mode cache 307, a predictor generator 310, a predictor reduction module 314, a predictor decision module 318, and a residual generation module 322. The spatial prediction module 300 receives a raw video stream 200, reconstructed previous blocks 232 for collecting in reconstructed mode cache 306, and predictor similarity thresholds 236, and generates output residuals 204 and the mode information 234 for each block.

The block separation module 302 receives a raw frame 200 and separates the raw frame 200 into a series of small blocks. For example, a 1920×1080 image frame may be separated into an array of luminance and chrominance 4×4 blocks containing a total of 16 pixels. The block separation module may also group the blocks into macro-blocks (also may be referred as Coding Units) representing both, luminance and chrominance components. In alternative embodiments, different sizes may be used for the blocks and macro-blocks. After separating the frame into blocks and, optionally, macro-blocks, the block separation module sends the blocks 304 to the predictor decision module 318 and after that to the residual generation module 322.

The reconstructed block cache 306 receives the blocks 232 for an entire video frame from the block reconstruction module 230 and sends the block pixels 308 to the residual generation module 322. The reconstruction block cache 306 also sends pixels 308 from selected blocks to the predictor generation module 310 for calculating spatial predictors for a block to be predicted. In one embodiment, the block cache sends the pixels from the spatial neighborhood of the block to be predicted to the predictor generation module.

The prediction mode cache 307 receives the selected modes 234 from the predictor decision module 318 and sends the selected modes 326 one at a time to the predictor reduction module 314. In one embodiment, the predictor mode cache sends the selected modes of blocks adjacent to the top and the left of the block to be predicted. If the selected modes of adjacent blocks are not available for the block than, then the predictor mode cache sends (non-angular) DC Intra prediction mode (a flat surface with a value matching the mean value of the boundary samples).

The predictor generation module 310 receives pixels 308 from other blocks in the frame and uses the pixels 308 to generate a plurality of spatial predictors for a block. In one embodiment, the predictor generation module 310 uses the pixels from the block neighborhood to calculate thirty five spatial predictors. Alternative embodiments may use more or fewer spatial prediction modes. The predictor generation module 310 sends the spatial predictors 312 to the predictor reduction module 314 after the spatial predictors are calculated.

The predictor reduction module 314 receives the full set of spatial predictors 312 from the predictor generation module 310 and groups the predictors into one or more sets of similar predictors. The predictor reduction module 314 generates the groups of similar predictors by calculating a difference metric (e.g., the Sum of Absolute Differences metric) between each pair of predictors. The difference metric quantifies the difference in content between two predictors, and the two predictors are considered similar if the difference metric falls below a similarity threshold. The similarity threshold can be calculated in the coding control module 210 and sent 236 to the predictor reduction module 314, or the similarity threshold can be a predetermined constant value that is saved in the predictor reduction module 314. For each set of similar predictors, the predictor reduction module 314 generates a representative predictor to represent the spatial predictors in the set. The process of grouping predictors into sets and generating a representative predictor is described in detail in FIG. 4A and FIG. 9. This process uses a fast algorithm with complexity O(N) where N is the number of prediction modes defined by coding specification. After determining or calculating the set of representative predictors, the predictor reduction module sends the representative predictors 316 to the predictor decision module 318.

The predictor decision module 318 receives a block 304 from the block separation module 302 and also receives the set of representative predictors 316 for the block from the predictor reduction module. The module 318 compares each representative predictor to the block and selects the predictor that is closest in terms of Rate-Distortion function value to the original block. The prediction mode information 234 for the selected predictor is sent to the lossless encoding module 218, to the residual generation module 322, and gets saved in prediction mode cache 307.

The residual generation module 322 receives the selected prediction mode 234 from the predictor decision module and also receives the corresponding block pixels 308 from the reconstructed block cache. The residual generation module 322 subtracts the selected predictor 234 from the block 308 to generate a residual that represents the difference between the selected predictor and the block. The residual 204 is then sent to the transform module 206.

Figure 3B:
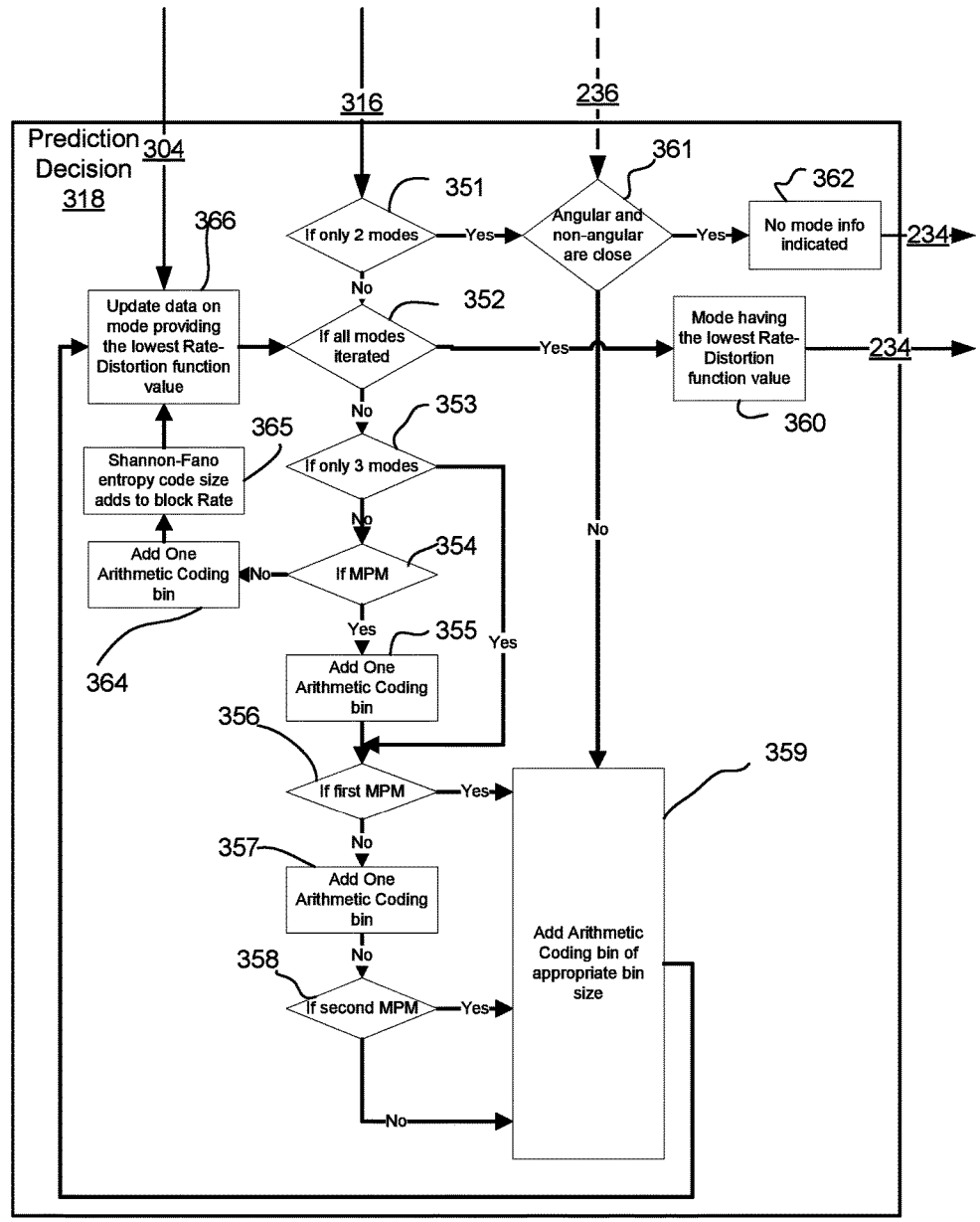
FIG. 3B is a flowchart illustrating operation in a predictor decision module, according to one embodiment.

FIG. 3B is a flowchart illustrating operation in a predictor decision module 318, according to one embodiment. The predictor decision module 318 receives reduced mode set 316 and generates prediction mode information 234.

If a single mode representing all possible predictors is generated by the predictor reduction module 314, no bit is used to represent this mode in the bitstream, as shown in positive decisions ("Yes") in blocks 351 and 361, and indicates that no bit is used (shown by block 362 in FIG. 3B). Otherwise, a positive decision ("Yes") in block 351 with a negative decision ("No") in block 361 indicates which one of the two modes is to be used in the reduced set. The two modes use one arithmetic coder bin produced in block 359 (written into the bit stream) to indicate which of the two modes is to be used during the decoding process.

A negative decision ("No") in block 351 involves iteration through all the modes from the reduced set starting from block 352. In decision blocks 353, 354, 356 in FIG. 3B, it is verified if the current mode being iterated satisfy certain conditions. A positive decision in block 353 indicates that there are only three modes in the reduced set, and therefore, there is no need to indicate which mode is to be used for coding among MPMs. Thus, three prediction modes in the reduced set use up to two arithmetic coder bins in the bitstream produced by blocks 357 and 359, or only block 359 depending on the decision made at block 356 in FIG. 3B. If the number of modes in the reduced set is higher than the number of MPMs defined by a coding specification (as indicated by a decision in the block 353 in the negative ("No"), the number is 3 for HEVC standard), it is determined at block 354 if MPM mode selection is made. If MPM mode is selected in block 354, the structure of MPMs selection method as described by HEVC coding specification is maintained and blocks 354 through 359 and 364 follow an algorithm specified in HEVC standard. However, if a non-MPM mode is selected, Shannon-Fano entropy coding in block 365 uses fixed length coding of HEVC to select a mode among a preliminarily known number of non-MPM modes. This allows selecting one mode from a set of modes of an arbitrary size.

The predictor decision module 318 uses the MPM selection method described by HEVC coder. For implementation of MPM selection, HEVC specification uses original mode numbers, but prediction for MPM selection coming from neighboring blocks represents modes from the reduced set. Thus, for utilization of MPM selection algorithm, those modes are to be mapped back into original mode numbers using representative mode indexes for grouped modes. If one of MPMs equals to another, the MPM is replaced with a mode not listed among MPMs and representing the largest number of predictors.

During each iteration through different modes to select a reduced modes set, a decision is made as to which of the modes being iterated is to be indicated in the bitstream for use by the decoder. A decision on the mode to be used for coding is made in block 366 by calculating values of Rate-Distortion function and selecting a mode that results in a lowest value in the function. Block 360 communicates the selected mode number 234 to lossless encoding module 218.

Arithmetic coding contexts used by blocks 355 and 364 are the same. That is, block 355 writes the most probable bin value, while blocks 364 writes the least probable bin value. Conditional blocks 356 and 358 consider remaining MPMs after that block 359 writes bin value with appropriate arithmetic coding context, which depends on path in FIG. 3B. When a positive decision is made in block 356, arithmetic coding contexts in blocks 357 and 359 are the same, in a similar way decisions in block 358 lead to block 359 using single arithmetic coder context for them.

For example, there are four grouped modes described in HEVC, which represent the following: $1^{st}$ mode—Planar and DC prediction modes (according to HEVC numbering); $2^{nd}$ mode—modes from the $2^{nd}$ up to $20^{th}$ (according to HEVC numbering) from the original modes set; $3^{rd}$ mode— in range from $21^{th}$ up to $27^{th}$; and $4^{th}$ modes in range from $28^{th}$ up to $34^{th}$.

MPM selection method as described in HEVC specification generates the following MPMs: (1) Planar (mode 0 according to HEVC numbering); (2) DC (mode 1 according to HEVC numbering); and (3) Vertical (mode 26 according to HEVC numbering). The $1^{st}$ and the $2^{nd}$ MPMs correspond to the $1^{st}$ mode in the reduced set; and MPM candidates are refined: $1^{st}$ mode, $3^{rd}$ mode and the $2^{nd}$ mode as a mode, which represent the largest group.

In order to maintain preferences that coding specification give to some of the modes for implementation of efficient MPM, predictors are changed to represent groups into one of preferred modes when a group contains such. Priorities within the set of preferred modes are set in order to simplify representative mode selection for groups containing multiple preferred modes.

Hints on priority setting might be embedded into coding specification. For example, preferred modes are defined in HEVC codec specs are named as VER_IDX+8, HOR_IDX, VER_IDX, DC_IDX and PLANAR_IDX. And it can be seen from the analysis of MPM of HEVC, planar mode has a higher priority than others because the specification associate a shorter code with modes with a higher probability.

If lowest Rate-Distortion function value is used at block 366, up to $[\log_2(N-n)]$(binary logarithm of N-n rounded up) bits may be added in the bitstream, where N represents is the size of reduced predictor mode set, and n represents a number of MPMs).

Predictor Mapping and Bit Stream Composition

Figure 4A:
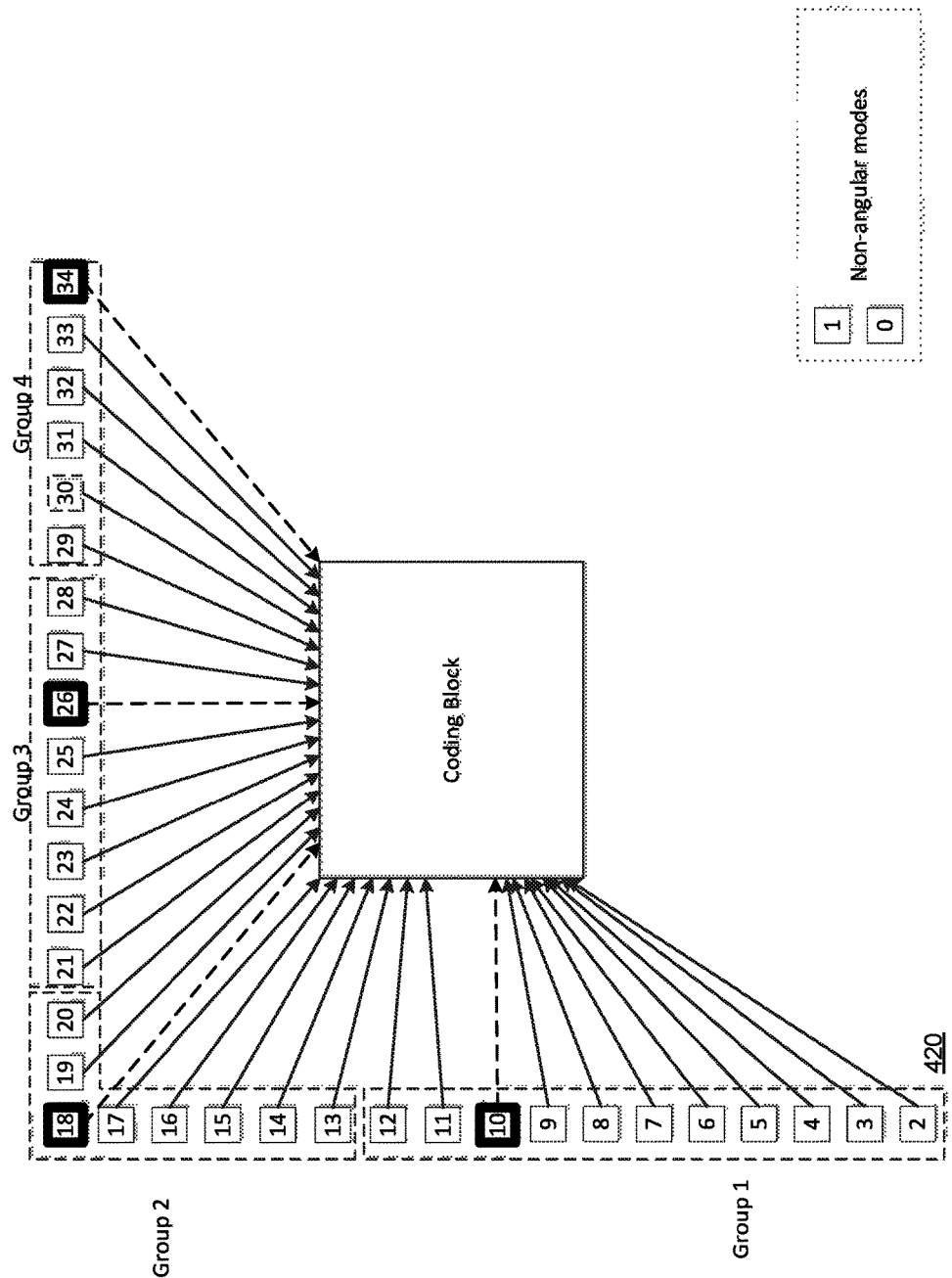
FIG. 4A illustrates a mapping from a set of spatial predictors to a smaller set of representative spatial predictors, according to one embodiment.

FIG. 4A illustrates mapping of a full set of original angular spatial predictors 2 through 34 for luminance blocks to a smaller set of representative spatial predictors (Groups 1, 2, 3 and 4), according to one embodiment. To generate the mapping, the predictor reduction module 314 calculates a difference metric between each pair of original predictors. In one embodiment, the difference metric is the Sum of Absolute Differences (SAD), which sums the absolute value of the difference between each pair of pixel at matching positions in the two predictors. If the difference metric falls below a similarity threshold, then the two predictors are considered to be similar. As described above, the similarity threshold may be calculated in the coding control module 210, or it may be a predetermined constant that is saved in the predictor reduction module 314. Non-angular predictors are not combined with angular predictors unless all angular predictors are similar. And angular modes are always combined without gaps in mode numbers ordered clockwise.

After the similarity calculations are completed, the predictor reduction module 314 organizes the original predictors into groups of similar predictors. If a predictor is not similar to any other predictor according to the similarity threshold, then the predictor is placed in its own new group.

All angular predictions are iterated in clockwise order and are added into the current group, this process continues while predictors representing them are similar (sum of absolute differences between predictor pixels, or a different similarity metric values, are below a threshold depending on Quantization parameter). First mode not satisfying the similarity criteria leads to new group creation for the current block being coded. For all such groups, a predictor representing the group using the mode closest in its similarity metric value to the average predictor over the group is chosen. Non-angular prediction modes are tested on similarity and replaced by a mode representing all of them as a group in case the similarity criteria is satisfied.

For each group of similar predictors, the predictor reduction module 314 generates a representative predictor to represent the predictors in the group. If a group of modes contains preferred modes defined by coding specification (such as horizontal, vertical, or mode having index 34 in HEVC), the representative predictor is selected among them. Otherwise those mode numbers to represent the group, which is the closest one within the group to the block obtained as the sum of all block in the group divided by the number of modes in it are chosen. For example, for group 1 consisting of predictors 2 to 12, the representative predictor 10 becomes the representative predictor for group 1 as it belongs to the set of preferred modes (Horizontal prediction mode). If a group contains multiple preferred modes, HEVC specification is followed in its determining priorities between preferred modes to make the selection.

After a representative predictor has been generated for each group of similar predictors, the predictor reduction module 314 enumerates each of the representative predictors. In one embodiment, the enumeration of the representative predictors is based on, for example, the clockwise order.

By generating and enumerating the representative predictors in a repeatable manner, the mapping from original predictors to representative predictors can be reconstructed during the decoding process as long as the set of original predictors is generated in the same order. This allows the decoding process to generate the same set of representative predictors in the same order. The decoder can accurately reproduce and enumerate the set of representative predictors because the prediction mode information 424 shown in FIG. 4B refers to the representative predictors using the same enumeration scheme.

Figure 4B:
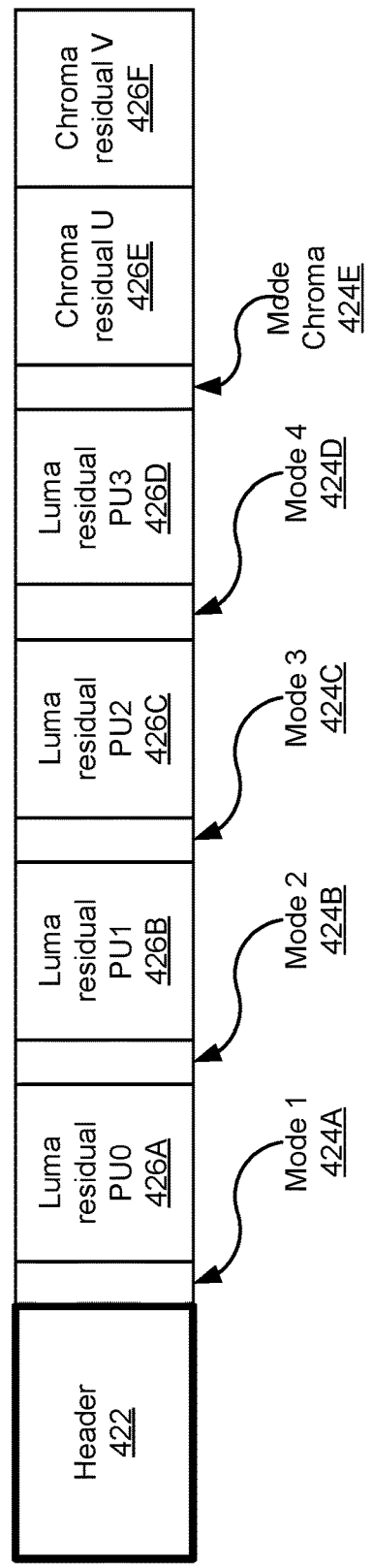
FIG. 4B illustrates a bit stream for an encoded video, according to one embodiment.

FIG. 4B illustrates the contents of one macro-block in the bit stream 420 for a video that has been encoded with the spatial predictor reduction process, according to one embodiment. The bit stream contains a header block 422, prediction mode information 424 for each block, and block data containing quantized transform coefficients for the sixteen blocks 426 in the macro-block. Although the macro-block shown in FIG. 4B contains 4 blocks, macro-blocks in alternative embodiments may contain a different number of blocks. In addition, the bit stream 420 may also contain other information that is not shown. For example, each frame may begin with a frame header indicating the values of the quantization coefficient and whether spatial or temporal prediction was used for the frame, although any of this information may also be stored in the header 422 on the macro-block level.

FIG. 4B illustrates prediction reduction for luminance blocks. Prediction reduction process for chrominance can be simplified such that angular modes are only grouped when all non-angular chrominance prediction modes are similar (i.e. difference is below the threshold) in both Chrominance components.

The header block 422 may contain information describing the type of encoding that was used for the macro-block. For example, the header 422 may include, among other information, a coding block pattern indicating which of the sixteen blocks were coded and which blocks were not coded. The header block 422 may also include the quantization coefficient and whether spatial or temporal prediction was used for the macro-block. The prediction mode information 424 precedes each block 426 and indicates which representative predictor was chosen when the block was encoded. The bit stream alternates between prediction mode information 424 and block data 426 because the prediction mode for a block may be defined relative to the prediction mode of the previous block.

Zero bits are used to represent the mode information if the predictor reduction module 314 generated one representative predictor (i.e., all 35 HEVC predictors were similar to each other). In the case where there is one representative predictor, no information is needed to indicate which predictor was chosen for the current block because only one choice is possible.

The method of creating representative predictors and storing mode information 424 described with reference to FIG. 4A may lead to a significant reduction in the number of bits that make up the bit stream 424. In video frames that contain large areas of similar information, such as blue skies or dark shadows, it is likely that the set of representative predictors 410 for the blocks associated with those areas will only contain one representative predictor, which means it is also likely that zero bits are used to represent the mode information. Using a set of representative predictors that may contain fewer predictors than the original set also increases the probability that the predictors selected for two consecutive blocks will be identical, in which case only one bit is needed to represent the mode information. In general, fewer bits are used to represent the mode information when the spatial predictor reduction process is used, which leads to a bit stream that contains fewer bits but can still be reproduced with little loss in picture quality relative to conventional methods of video compression.

Decoder Architecture Overview

Figure 5:
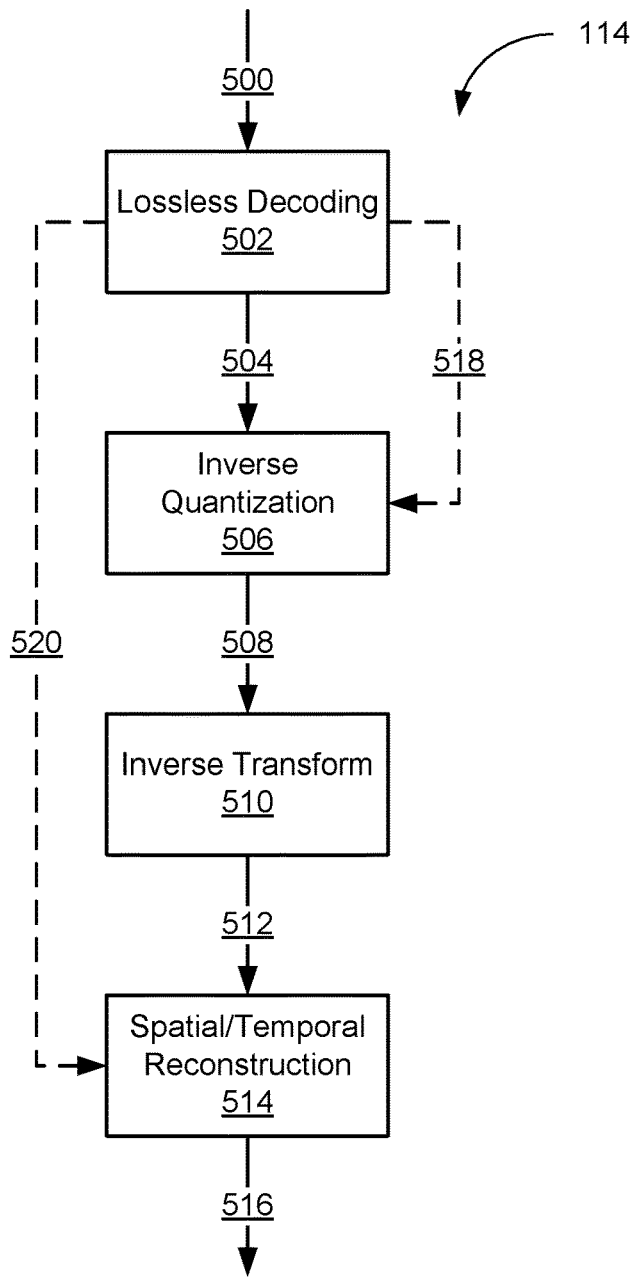
FIG. 5 is a block diagram illustrating a decoding module, according to one embodiment.

FIG. 5 is a block diagram illustrating the video decoding module 114 in detail, according to one embodiment. The video decoding module 114 may contain, among other components, modules to perform lossless decoding 502, inverse quantization 506, inverse transformation 510, and spatial/temporal reconstruction 514. Together, the components 502, 506, 510, 514 of the video decoding module 114 convert an encoded bit stream 500 containing residuals and mode information into a reconstructed video stream 516 that can be displayed to the user.

The lossless decoding module 502 receives the encoded bit stream 500 and reverses the data compression that was performed in the lossless encoding module 218 of the encoding module 112. After decoding the bit stream 500, the lossless decoding module 502 sends the decoded bit stream 504 to the inverse quantization module 506. The decoded bit stream 504 contains the elements shown in FIG. 4B, including, among other things, a header 422 for each macro-block, mode information 424 for each block 426, and block data 426 that contains the quantized transform coefficients for each block. If additional information was stored in the encoded bit stream 500 (e.g., a quantization coefficient), the lossless decoding module 502 sends the information to the appropriate modules within decoding module 114. In particular, the lossless decoding module 502 sends the quantization coefficient 518 to the inverse quantization module 506 and sends the similarity threshold 520 to the spatial/temporal reconstruction module 514.

The inverse quantization module 506 uses a quantization coefficient to convert the quantized transform coefficients in the block data 426 of the decoded bit stream 504 into reconstructed transform coefficients. In one embodiment, the quantization coefficient is stored in the encoded bit stream 500 and the inverse quantization module 506 receives the quantization coefficient 518 separately from the decoded bit stream 504. It is also possible for the quantization coefficient to be a predetermined value or array of values that is defined as part of a video codec and saved in the inverse quantization module 506. Since the quantization step performed in the encoding module 112 was a many-to-one mapping, the inverse quantization module 506 may not be able to reconstruct the exact values of the transform coefficients. After the inverse quantization module 506 calculates the reconstructed transform coefficients, the reconstructed transform coefficients are stored in the block data 426 of the bit stream in place of the quantized transform coefficients, and the modified bit stream 508 is sent to the inverse transform module 510.

The inverse transform module 510 receives the modified bit stream 508 from the inverse quantization module 506 and performs an inverse mathematical transform on the reconstructed transform coefficients in the bit stream to calculate a reconstructed residual. For example, if the transform module 206 used the discrete cosine transform (DCT) to decompose the residual into transform coefficients, then the inverse transform module 510 would use the inverse discrete cosine transform to reconstruct the residual from the reconstructed transform coefficients. The reconstructed residuals are saved in the block data 426 of the bit stream in place of the reconstructed transform coefficients and the processed bit stream 512 is sent to the spatial/temporal reconstruction module 514.

The spatial/temporal reconstruction module 514 receives the processed bit stream 512 containing, among other things, header information for macro-blocks, mode information for each block, and reconstructed residuals for each block. The processed bit stream may also contain information indicating whether spatial or temporal prediction was used for each frame or macro-block. If the bit stream indicates that temporal prediction was used for a macro-block, then a temporal prediction module is used to reconstruct the macro-block. If spatial prediction was used, then a spatial reconstruction module replicates the spatial predictor reduction process to recreate the set of representative predictors and reconstructs the macro-block using the mode information, the representative predictors, and the residuals. After the macro-blocks for a frame are reconstructed, the spatial-temporal reconstruction module maps the macro-blocks to their positions within the frame and outputs the entire frame 516 in a format that can be displayed to the user.

Figure 6:
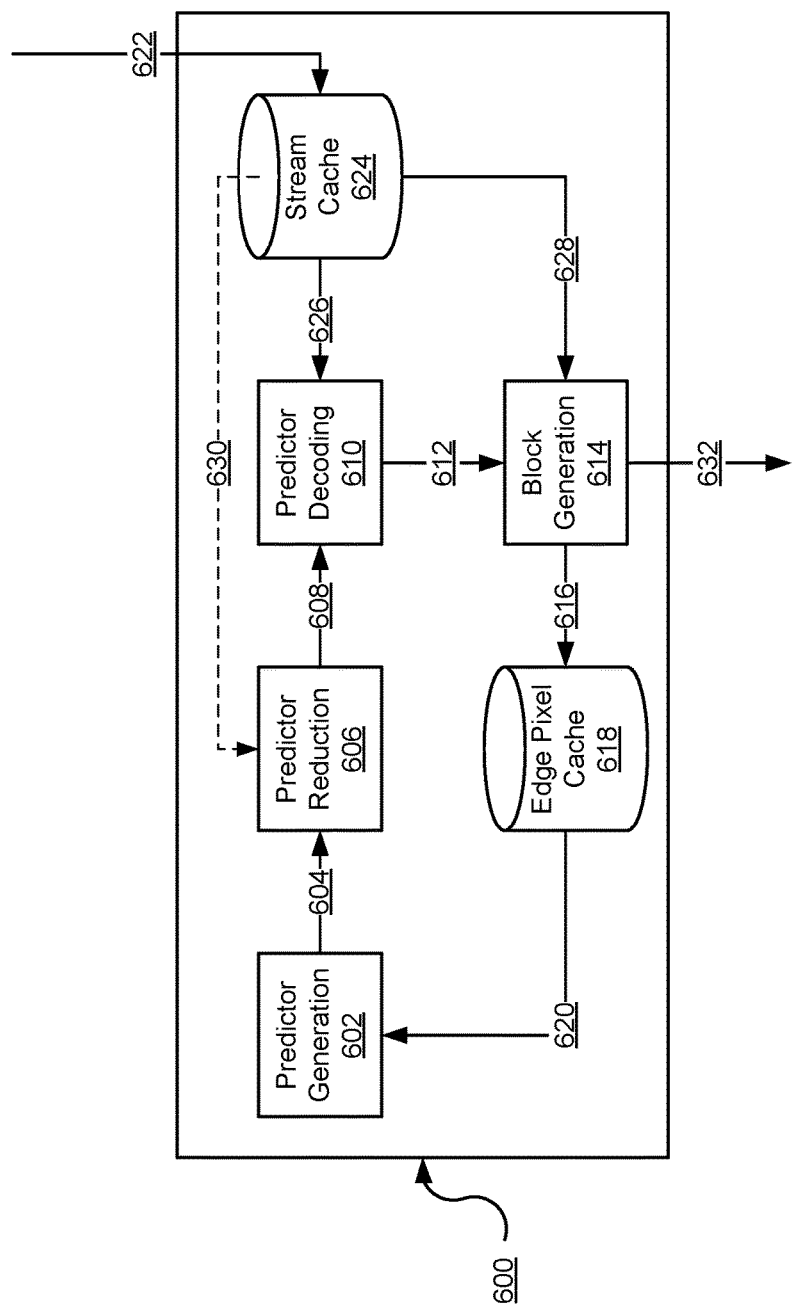
FIG. 6 is a block diagram illustrating a system for performing spatial reconstruction of blocks in an encoded video frame, according to one embodiment.

FIG. 6 is a block diagram illustrating a module 600 within the spatial/temporal reconstruction module 514 that performs spatial reconstruction for a macro-block 622 that was created using the spatial predictor reduction process. The spatial reconstruction module 600 contains, among other components, a predictor generation module 602, a predictor reduction module 606, a predictor decoding module 610, a block generation module 614, an edge pixel cache 618, and a stream cache 624. The spatial reconstruction module 600 receives a macro-block 622 containing reconstructed residuals and generates a reconstructed macro-block 632.

After the spatial/temporal reconstruction module 514 determines that a macro-block in the processed bit stream 512 was created with the spatial prediction reduction process (as described above in detail with reference to FIGS. 3 and 4A), the spatial/temporal reconstruction module 514 sends the macro-block 622 (including the header 422 and mode information 424, as shown in FIG. 4B) to the stream cache 624. The stream cache 624 sends different portions of the macro-block to different modules within the spatial reconstruction module 600. The prediction mode data 626 is sent to the predictor decoding module 610 and the block data 628 containing the reconstructed residual is sent to the block generation module 614. If a similarity threshold was saved in the bit stream, either on the frame level or on a lower level (e.g., associated with a specific color component, slice, or macro-block), then the similarity threshold 630 is sent to the predictor reduction module 606.

The spatial reconstruction process starts at the predictor generation module 602, which receives the edge pixels 620 that are needed to generate the full set of original predictors for a block. The original predictors 604 are sent to the predictor reduction module 606, which performs the same spatial predictor reduction process as the predictor reduction module 314 in the encoding module to generate a set of representative predictors, as described above with reference to FIG. 3. If the similarity threshold was saved in the bit stream, then the predictor reduction module 606 receives the similarity threshold 630 from the stream cache 624. The similarity threshold may also be stored in the predictor reduction module 606 as a predefined value.

After the predictor reduction module 606 generates a set of representative predictors, the predictor reduction module 606 sends the representative predictors 608 to the predictor decoding module 610. The predictor decoding module 610 receives the representative predictors 608 and the mode information 626. Since the mode information 626 may be defined relative to the prediction mode that was chosen for the previous block, the predictor decoding module 610 contains a mode cache that is used to store the prediction mode for the previous block. The predictor decoding module 610 uses the mode information 626 and the mode cache to determine which representative predictor was chosen during the encoding process, and the chosen representative predictor 612 is sent to the block generation module 614.

The block generation module 614 receives the chosen predictor 612 and the reconstructed residual 628, and generates a reconstructed block 632 by adding the predictor 612 and the residual 628. The block generation module 614 outputs the reconstructed block 632, and a different component in the spatial/temporal reconstruction module 514 assembles the blocks in each frame and maps each block to its position within the frame. The block generation module 614 also sends one or more of the pixels 616 in the reconstructed block to the edge pixel cache 618, where the pixels are stored and used to generate predictors for subsequent blocks. In one embodiment, the block generation module 614 sends the pixels 616 along the right edge and the bottom edge of the reconstructed block to the edge pixel cache, but in alternative embodiments, any of the pixels 616 in the reconstructed block may be sent to the edge pixel cache 618.

The edge pixel cache 618 contains the pixels that are used to calculate prediction modes for subsequent blocks. The cache 618 receives one or more pixels 616 from each decoded block after the decoded block is generated in the block generation module 614, and the pixels are saved in the edge pixel cache 618 until the pixels 620 are sent to the predictor generation module 602 to be used to calculate prediction modes. In one embodiment, the predictor generation module 602 uses the pixels adjacent to the top and left edges of the block to be predicted, so the edge pixel cache 618 receives and stores pixels along the right and bottom edges of each reconstructed block. After a set of pixels has been used to generate predictors in the predictor generation module 602, the edge pixel cache may delete the pixels to reduce memory use.

Process of Determining Representative Spatial Predictors

Figure 7:
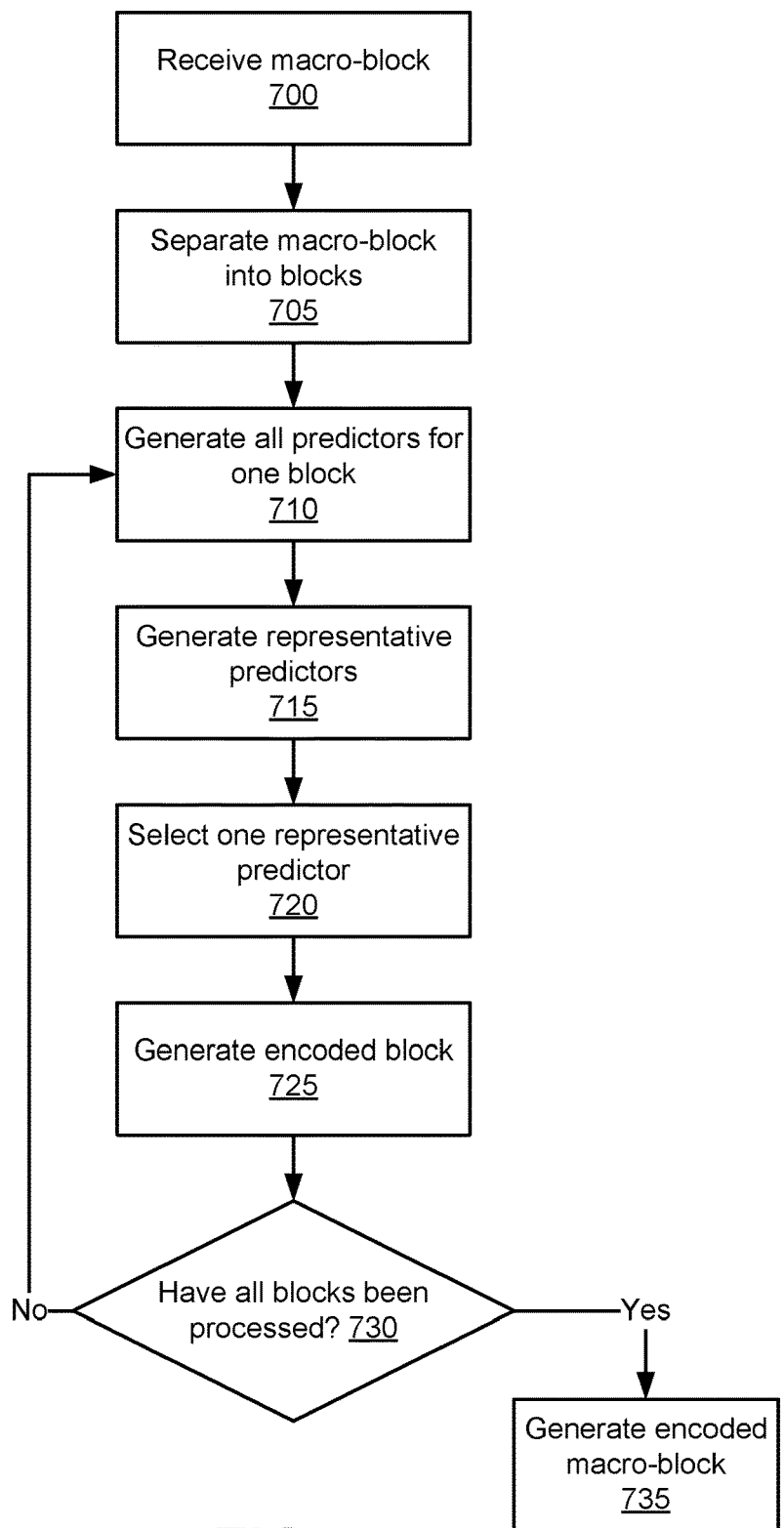
FIG. 7 is a flow chart illustrating a process for encoding a macro-block, according to one embodiment.
Figure 8:
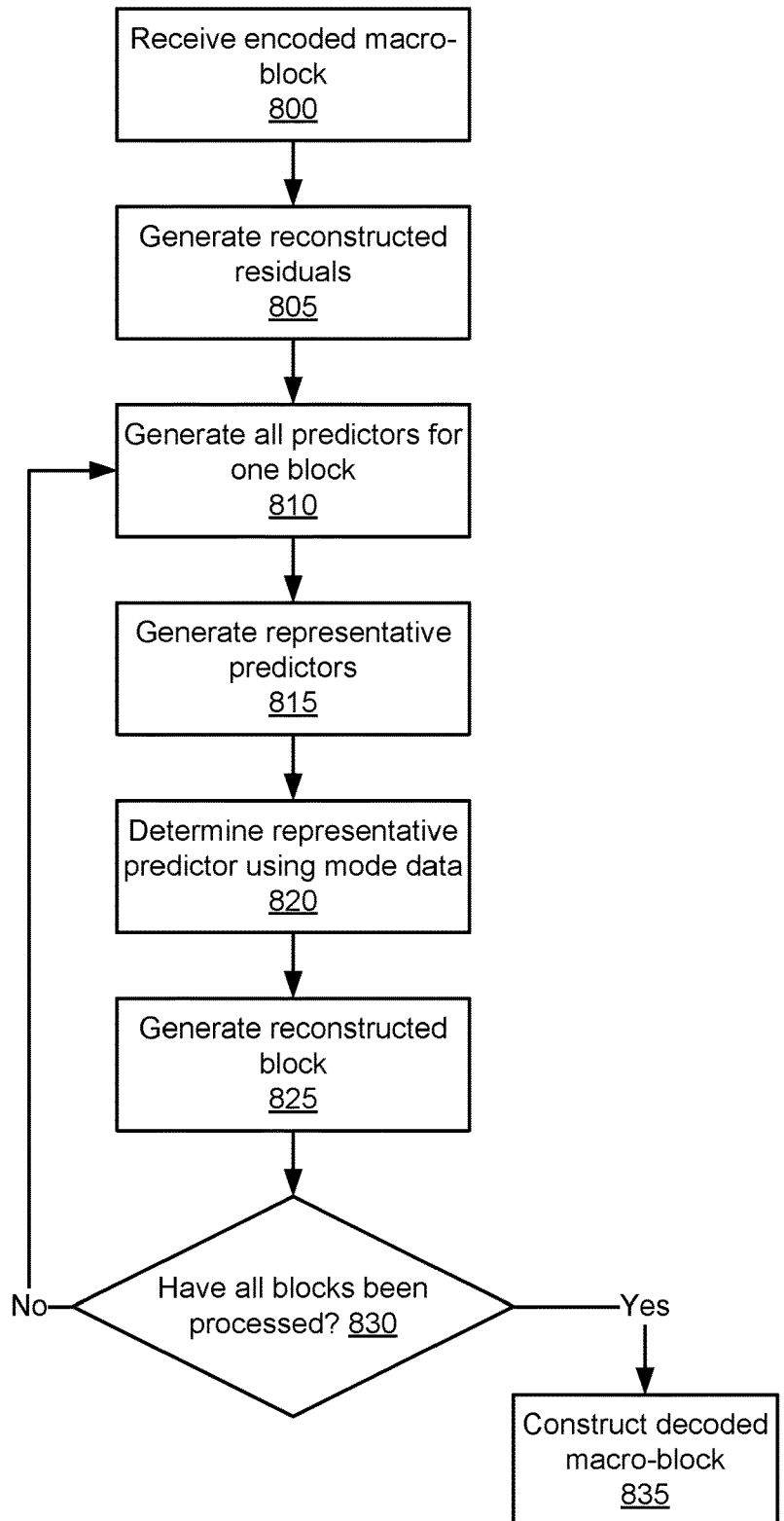
FIG. 8 is a flow chart illustrating a process for decoding a macro-block, according to one embodiment.
Figure 9:
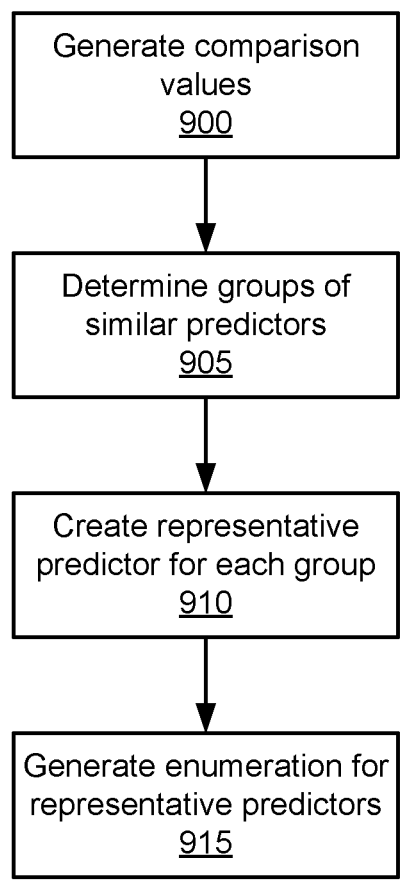
FIG. 9 is a flow chart illustrating a process for reducing a set of spatial predictors down to a set of representative spatial predictors, according to one embodiment.

FIGS. 7 through 9 are flow charts illustrating a method of encoding and decoding a video using the spatial predictor reduction process. FIG. 7 is a flow chart illustrating a process for encoding a macro-block using the spatial predictor reduction process, according to one embodiment. The process begins when the block separation module 302 in the spatial prediction module 300 receives 700 a macro-block as part of a raw image frame. The block separation module 302 separates the raw frame into macro-blocks, and then separates 405 the macro-blocks into blocks. In one embodiment, the macro-block is separated into a 4×4 grid of blocks, which yields a total of sixteen blocks for each macro-block.

After the macro-block is separated 705 into blocks, the predictor generation module 310 generates 710 a full set of spatial predictors for a block using one or more pixels in the frame. In one embodiment, there are a total of nine spatial prediction modes, so the predictor generation module generates nine spatial predictors, although a different number of prediction modes may be used. In some embodiments, the prediction modes use the pixels adjacent to the top and left edge of the block, but any set of pixels in the same frame may be used to generate the predictors.

The predictor reduction module 314 uses the full set of predictors to generate 715 a set of representative predictors, where each representative predictor represents a group of similar predictors in the full set of predictors. Predictors within the full set of predictors are likely to be similar to each other for blocks that depict uniform areas of a frame, such as dark shadows or cloudless skies. In these cases, the set of representative predictors contains fewer predictors than the full set of predictors.

Next, the predictor decision module 318 compares each representative predictor to the original block and selects 720 the representative predictor that is the closest match. The predictor decision module 318 may perform the comparisons by calculating the sum of absolute differences (SAD) metric between the original block and each representative predictor, or it may use some other method to quantify the difference between the representative predictors and the block.

After a representative predictor is selected 720, the residual generation module 322, the transform module 206, and the quantization module 214 work together to generate 725 the encoded block. To encode the block, the residual generation module 322 subtracts the selected predictor from the original block to generate a residual describing the difference between the block and the predictor. Then the transform module 206 uses a mathematical transformation (e.g., DCT transformation) to decompose the residual into a series of transform coefficients, and the quantization module 214 quantizes the transform coefficients to reduce the number of bits needed to represent the coefficients in the bit stream.

When the block encoding process 725 is complete, the encoding module 112 checks 730 to determine whether every block in the macro-block has been processed. If some of the blocks have not yet been processed, then the encoding module starts processing the next block in the macro-block by generating 710 a full set of predictors for the next block. If every block in the macro-block has been processed, then the lossless encoding module 218 generates 735 the encoded macro-block by assembling and compressing the header information 422, the mode information 424, and the quantized transform coefficients for each block 426 into the bit stream 420 shown in FIG. 4B. The result is an encoded macro-block that may be stored or transmitted with fewer bits than the raw, unencoded macro-block but still contains enough information for the decoding module 114 to reconstruct the macro-block and display the macro-block to a user.

In other embodiments, some of the steps shown in FIG. 7 may be omitted, performed in a different sequence, or performed in parallel. For example, the step of separating 705 the macro-block into blocks may be omitted and the subsequent steps 710, 715, 720 may be performed at the macro-block level. In this case, the steps of generating 725 the encoded block and determining 730 whether all block have been processed are rendered moot, so the encoding module 112 generates 735 the encoded macro-block after selecting 720 a representative predictor. In addition, the process of generating 715 representative predictors may be performed before all predictors for one block are generated 710. As described with reference to FIG. 9, the first step in the process of generating 715 representative predictors is to generate 900 difference metrics between each pair of predictors, and this step 900 may begin as long as two predictors or more have been generated.

FIG. 8 is a flow chart illustrating a process for reconstructing a macro-block that was encoded with the spatial predictor reduction process, according to one embodiment. The process starts when the lossless decoding module 502 in the decoding module 114 receives 800 an encoded bit stream containing one or more macro-blocks that were encoded with the spatial prediction reduction process. After the macro-blocks are received 800, the lossless decoding module 502, inverse quantization module 506, and inverse transform module 510 use the quantized transform coefficients in the bit stream to reconstruct 805 the residual for each block in the macro-block.

For each block, the predictor generation module 602 uses edge pixels from other blocks in the frame to generate 810 a plurality of spatial predictors using a plurality of spatial prediction modes. The number of prediction modes is typically defined in a video codec. For example, the H.264 standard contains nine predefined prediction modes, although other embodiments may include fewer, different, or additional prediction modes.

The predictors that were generated 810 in the predictor generation module 602 are passed on to the predictor reduction module 606, which uses a similarity threshold to generate 815 a set of representative predictors. To ensure that the same set of representative predictors is created in the encoding module 112 and the decoding module 114, the process used to generate 815 representative predictors during the decoding process is identical to the process used to generate 715 representative predictors during the encoding process.

After the predictor reduction module 606 generates 815 the set of representative predictors, the predictor decoding module 610 uses the mode data in the bit stream to determine 820 which representative predictor was chosen to generate the residual for the block during the encoding process.

Next, the block generation module 614 adds the chosen representative predictor to the reconstructed residual to generate 825 the reconstructed block. After the block has been reconstructed, the decoding module 114 checks to determine 830 whether every block in the macro-block has been processed. If one or more blocks are still to be processed, then the predictor generation module 602 generates 810 the plurality of spatial predictors for the next block. If every block in the macro-block has been processed, then the spatial/temporal reconstruction module 514 constructs 835 the decoded macro-block by mapping each block to its position within the macro-block and mapping the macro-block to its position within the video frame.

In other embodiments, some of the steps shown in FIG. 8 may be omitted, performed in parallel, or performed in a different order. For example, if the steps 710, 715, 720 surrounding the generation of the representative predictors were performed on the macro-block level instead of on the block level during the encoding process, then it is not necessary to determine 830 whether all blocks have been processed. In this case, the decoded macro-block can be constructed 835 after the decoding module 114 generates 325 the reconstructed macro-block by adding the residual to the predictor. Again, the process of generating 815 representative predictors may be performed before all predictors for one block are generated 810 because the step of generating 900 difference metrics may begin as soon as two predictors are available. The decoding module 114 may also analyze the mode data to determine 820 which representative predictor was used before generating 815 the relative predictors. By analyzing the mode data first, the decoding module 114 may reduce its processing use by only generating the representative predictor that was used.

FIG. 9 is a flow chart illustrating the spatial predictor reduction process in detail, according to one embodiment. The process shown in FIG. 9 occurs in the predictor reduction module 314 of the spatial prediction module 300 and in the predictor reduction module 606 of the spatial reconstruction module 600. After the predictor reduction module 314, 606 receives the plurality of spatial predictors from the predictor generation module 310, 602, the predictor reduction module generates 900 a difference metric between each pair of spatial predictors. In one embodiment, the difference metric is the sum of absolute differences (SAD) metric, but any method of comparing two predictors may be used. For example, the difference metrics may be generated by comparing the average luminance or chrominance values of the two predictors.

After generating 900 the difference metrics, the predictor reduction module 314, 606 analyzes the difference metrics to organize 905 the predictors into groups of similar predictors. The predictor reduction module 314, 606 uses a similarity threshold to determine whether any two predictors are similar. If the difference metric between the two predictors falls below the similarity threshold, then the two predictors are considered similar and the predictor reduction module 314, 606 places the predictors in the same group. If the difference metric between a third predictor and one of the predictors in the group also falls below the similarity threshold, then the predictor reduction module 314, 606 also adds the third predictor to the group. Meanwhile, if a predictor is not similar to any other predictor (i.e., if the difference metric between the predictor and every other predictor is above the similarity threshold), then the predictor reduction module 314, 606 places the predictor in its own group.

For each group of similar predictors, the predictor reduction module 314, 606 creates 910 a representative predictor that represents the predictors in the group. In one embodiment, the predictor reduction module 314, 606 may create each representative predictor by copying one of the predictors in the group (e.g., the predictor with the lowest index). The predictor reduction module may also use some other method of creating the representative predictor, such as taking an average of one or more of the predictors in the group.

After the predictor reduction module 314, 606 creates 910 a representative predictor for each group of similar predictors, the predictor reduction module enumerates 915 each representative predictor. The same method of enumeration is used during the encoding and decoding processes to ensure that the mode data in the bit stream is decoded correctly. As a result, the enumeration process 915 does not use data that cannot be reproduced in the decoding process. For example, the enumeration method described in conjunction with FIG. 4A is based on the indices of the predictors in each group, and these indices can be reproduced during the decoding process by generating the predictors in the same order as during the encoding process. In other embodiments, other enumeration methods may be used as long as the method is based on data that is available during both the encoding and decoding processes.

In alternative embodiments, some of the steps shown in FIG. 9 may be performed in parallel. For instance, the predictor reduction module 314, 606 may begin comparing the difference metrics to the similarity threshold to determine 905 groups of similar predictors once the first difference metric has been generated 900, and the step of generating 900 the rest of the difference metrics may be performed in parallel with using the difference metrics to determine 905 groups of similar predictors. The predictor reduction module 314, 606 may also begin creating 910 a representative predictor for each group of similar predictors once the first group of similar predictors has been determined. There is no need to wait for each predictor to be placed into a 910 group before creating the representative predictors.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as described with reference to FIGS. 1-3 and FIGS. 5-6. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for reducing the number of spatial predictors used in a video compression process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for encoding an image frame, the method comprising:
generating, using predictor modes, a set of predictors for an image block of an image frame comprising a plurality of image blocks, each of the set of predictors generated with a different prediction mode, the prediction modes including angular prediction modes and non-angular prediction modes;
generating one or more groups of predictors by comparing the set of predictors by making comparison of the set of predictors in a predetermined sequence based on a difference metric, similar predictors assigned to a same group of predictors;
for each of the one or more groups of predictors, generating a representative predictor in the group of predictors by averaging the group of predictors;
selecting one predictor of one or more representative predictors with a lowest difference in content relative to the image block; and
encoding the image block based on the selected predictor.

2. The method of claim 1, wherein the coding scheme is High Efficiency Video Coding (HEVC) specification.

3. The method of claim 1, wherein the representative predictor is generated by a mode that is defined in a coding specification as being a preferred mode.

4. The method of claim 1, further comprising generating bitstream including the image block encoded using the selected predictor, the bitstream comprising prediction mode information and Luma residual blocks generated using a predictor mode indicated in the prediction mode information.

5. The method of claim 4, wherein the prediction mode information precedes a corresponding Luma residual block.

6. The method of claim 4, wherein a bit in the prediction mode information is omitted when one group of predictors is generated.

7. The method of claim 6, wherein the prediction mode information including at most two bits when three groups of predictors are generated.

8. The method of claim 1, wherein the difference metric is the Sum of Absolute Differences metric.

9. The method of claim 1, wherein a most probable modes (MPM) selection or non-MPM selection is performed when more than three groups of predictors are generated.

10. The method of claim 9, wherein Shannon-Fano entropy coding is used to select when the non-MPM selection is performed.

11. A non-transitory computer readable medium configured to store instructions, the instructions when executed by a processor cause the processor to:
generate, using predictor modes, a set of predictors for an image block of an image frame comprising a plurality of image blocks, each of the set of predictors generated with a different prediction mode, the prediction modes including angular prediction modes and non-angular prediction modes;
generate one or more groups of predictors by comparing the set of predictors by making comparison of the set of predictors in a predetermined sequence based on a difference metric, similar predictors assigned to a same group of predictors;
for each of the one or more groups of predictors, generate a representative predictor in the group of predictors by averaging the group of predictor;
select one predictor of one or more representative predictors with a lowest difference in content relative to the image block; and
encode the image block based on the selected predictor.

12. The computer readable medium of claim 11, wherein the coding scheme is High Efficiency Video Coding (HEVC) specification.

13. The computer readable medium of claim 11, wherein the representative predictor is generated by a mode that is defined in a coding specification as being a preferred mode.

14. The computer readable medium of claim 11, wherein the instructions cause the processor to further generate bitstream including the image block encoded using the selected predictor, the bitstream comprising prediction mode information and Luma residual blocks generated using a predictor mode indicated in the prediction mode information.

15. The computer readable medium of claim 14, wherein the prediction mode information precedes a corresponding Luma residual block.

16. The computer readable medium of claim 14, wherein a bit in the prediction mode information is omitted when one group of predictors is generated.

17. The computer readable medium of claim 16, wherein the prediction mode information including at most two bits when three groups of predictors are generated.

18. The computer readable medium of claim 11, wherein a most probable modes (MPM) selection or non-MPM selection is performed when more than three groups of predictors are generated.

* * * * *

UNITED STATES PATENT AND TRADEMARK OFFICE
CERTIFICATE OF CORRECTION

PATENT NO. : 10,045,022 B2  
APPLICATION NO. : 15/214732  
DATED : August 7, 2018  
INVENTOR(S) : Mikhail Korman and Oleg V. Prosekov Page 1 of 1

It is certified that error appears in the above-identified patent and that said Letters Patent is hereby corrected as shown below:

In the Claims

Column 21, Line 25, Claim 11, delete "group of predictor;" and insert --group of predictors;--.

Signed and Sealed this  
Nineteenth Day of March, 2019

Andrei Iancu  
*Director of the United States Patent and Trademark Office*